Oct. 26, 1943.  A. R. MORRILL  2,332,657
CHAINSTITCH INSEAM SHOE SEWING MACHINE
Original Filed April 1, 1937   8 Sheets-Sheet 2

Fig. 2

Inventor
Alfred R. Morrill
by Fish Hildreth
Cary & Jenney Attys

Oct. 26, 1943.    A. R. MORRILL    2,332,657
CHAINSTITCH INSEAM SHOE SEWING MACHINE
Original Filed April 1, 1937    8 Sheets-Sheet 4

Fig. 4

Oct. 26, 1943.                A. R. MORRILL                2,332,657
                  CHAINSTITCH INSEAM SHOE SEWING MACHINE
                  Original Filed April 1, 1937    8 Sheets-Sheet 6

Patented Oct. 26, 1943

2,332,657

UNITED STATES PATENT OFFICE 2,332,657

CHAINSTITCH INSEAM SHOE SEWING MACHINE

Alfred R. Morrill, Beverly, Mass., assignor to United Shoe Machinery Corporation, Borough of Flemington, N. J., a corporation of New Jersey Original application April 1, 1937, Serial No. 134,319. Divided and this application January 30, 1940, Serial No. 316,385

10 Claims. (Cl. 112—47)

The present invention relates to inseam shoe sewing machines, and is herein shown as embodied in a curved hook needle chainstitch machine similar in many respects to the machines disclosed in applicant's prior patents, No. 1,971,575 dated August 28, 1934, and No. 2,041,945 dated May 26, 1936.

An object of the present invention is to provide a chainstitch inseam shoe sewing machine of that type in which the chain of the seam is laid in the channel of the insole, having an improved mechanism for feeding the work continuously during the inseam sewing operation.

Another object of the invention is to provide a chainstitch inseam shoe sewing machine of the type last referred to with an improved means for separating the awl from the needle at the completion of the sewing operation in order to facilitate the removal of the sewed shoe from the machine.

Other objects of the invention are, in general, to improve the construction and mode of operation of the various parts of inseam shoe sewing machines, as will hereinafter appear.

With the above objects in view, the present invention consists in the novel constructions, combinations and arrangements of parts hereinafter described and claimed, the advantages of which will be apparent to those skilled in the art from the following description, taken in connection with the accompanying drawings which illustrate a welt shoe sewing machine provided with specific embodiments of the several features of the invention.

Referring to the drawings.

Except as pointed out herein and in applicant's United States Letters Patent No. 2,220,112, granted November 5, 1940, on an application Ser. No. 134,319 filed April 1, 1937, of which the present application is a division, the various parts of the machine illustrated in the drawings are constructed, arranged and operated as in the machine of applicant's prior Patent No. 2,041,945. The machine is provided with a curved hook needle 2, arranged to enter the work from the channel side, a curved awl 4 entering the work from the welt side, a thread finger 6, a looper 8, and a take-up 10. Work piercing and retracting movements are imparted to the needle and awl, and thread handling movements are imparted to the thread finger, looper, and take-up from the cam shaft 12 through connections which are the same as those embodied in the machine of applicant's prior Patent No. 2,041,945. The machine is also provided with a work rest and a welt guide constructed, arranged and actuated as in the machine of applicant's prior Patent No. 2,041,945, with the exception that a separate cam lever is provided for actuating the locking pawl of the welt guide mechanism and is arranged to engage an arm projecting from one of the rear supporting links of the welt guide carrier.

The driving and stopping mechanism of the machine illustrated in the drawings is also the same as that embodied in the machine of applicant's prior Patent No. 2,041,945 comprising a high speed treadle controlled clutch for driving the cam shaft from the vertical shaft 14 through the spiral gears 16 and 18 and an automatically controlled reversely driven slow speed clutch, the driving member of which is formed in a gear 20 loosely mounted on the cam shaft. The driven member of the slow speed clutch is indicated at 22. The timing cam by which it is moved into and out of engagement with the driven member of the clutch in stopping the machine is indicated at 24. The bell crank which is vibrated by the cam while the machine is in operation and which is locked against movement when the machine is to be stopped, is indicated at 26. The yieldingly mounted slide which carries the locking pin is indicated at 28 and the locking pin which is controlled through connections to the starting and stopping treadle is indicated at 30. The gear 20 of the slow speed reverse driving and stopping clutch is continuously driven as in the machine of applicant's prior patent, and through a similar train of connections actuates the welt severing mechanism.

Figure 21:
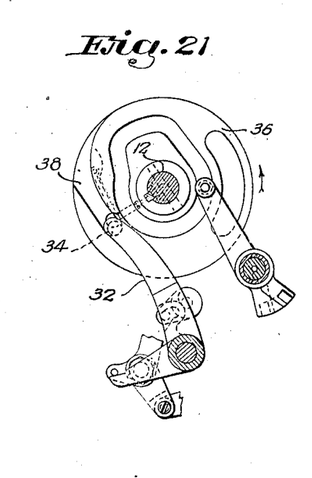
Figure 21 is a detail sectional view illustrating particularly the stop lever of the machine and its operating cam.

Mechanism for stopping the machine also includes the stop arm and cam follower of the mechanism disclosed in applicant's prior Patent No. 2,041,945, the stop arm (see more particularly Figure 21) being indicated at 32, the follower at the outer end of the arm being indicated at 34, and the cam slot in a cam disk 36 on the cam shaft 12 which is engaged by the follower during the reverse rotation of the cam shaft in stopping the machine being indicated at 38. The stop arm 32, through connections substantially the same as those embodied in the machine of applicant's prior Patent No. 2,041,945, retracts the welt guide as the machine stops and also moves the devices which lock the welt gripping and cutting mechanism out of operation while the machine is running to a position which permits the welt gripping and cutting mechanism to be thrown into operation by a pull on the welt.

The welt severing and gripping devices comprise welt and thread gripping jaws 40 and 42 and a welt and thread severing knife 44 which, after the welt and thread have been gripped by the jaws 40 and 42, is arranged to be moved lengthwise of the jaws across the welt and thread clamped by the jaws.

Figure 1:
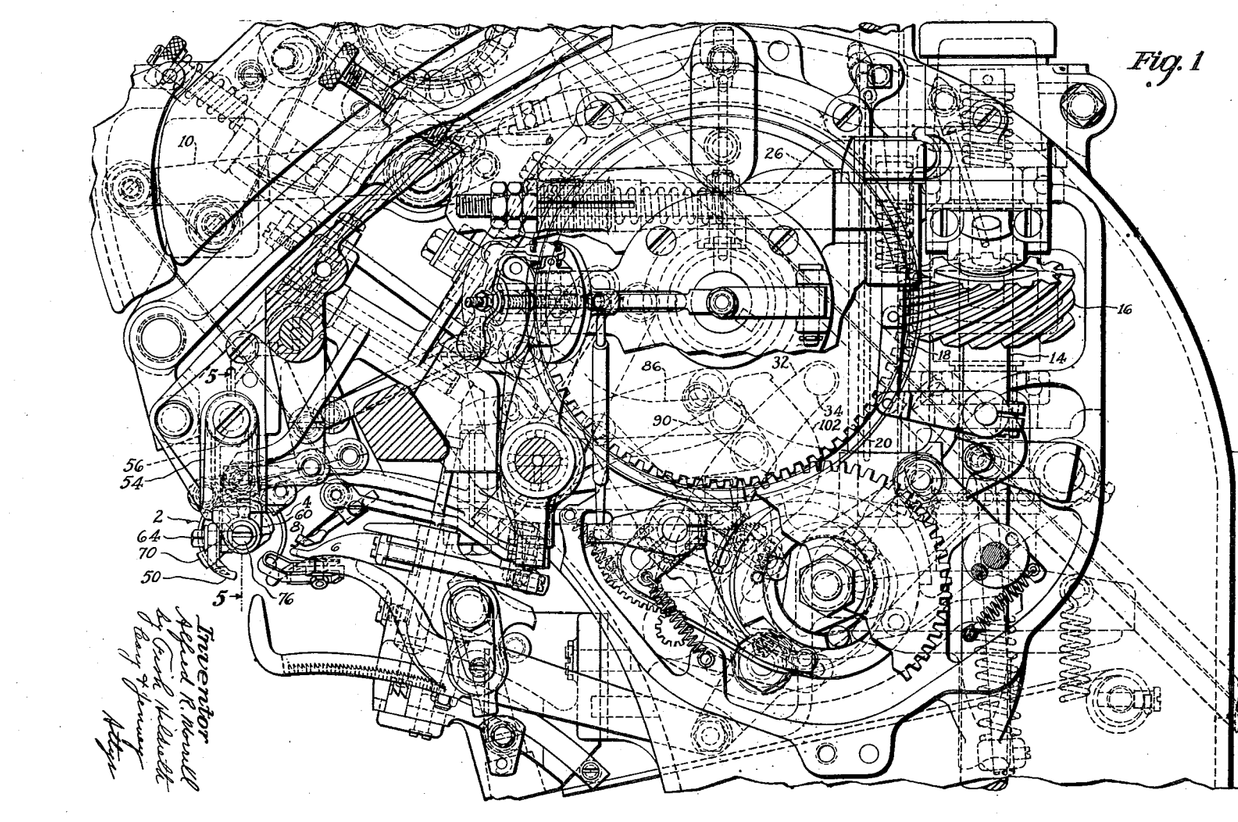
Figure 1 is a view in side elevation of the head of the machine.
Figure 2:
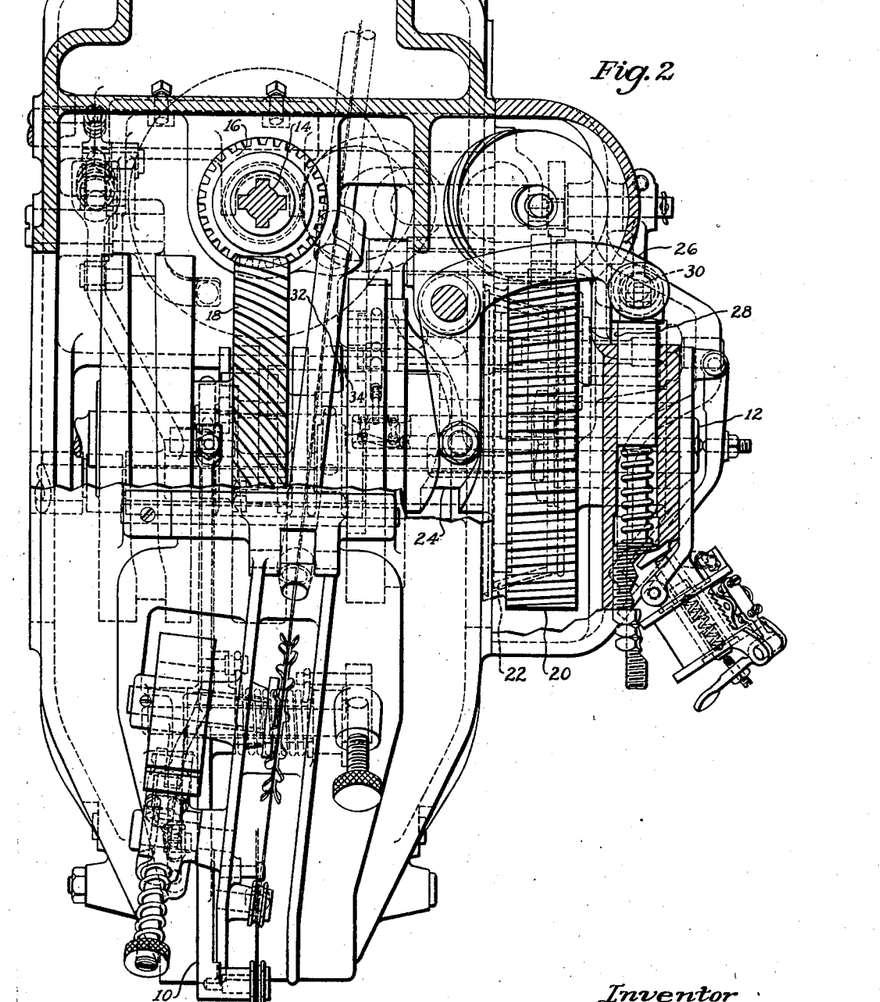
Figure 2 is a plan view with a portion of the casing broken away to show underlying parts.

The new and improved means for feeding the work continuously, with which the illustrated machine has been provided, are best illustrated in Fig. 1, and in Figs. 4 to 11 inclusive. The work is fed by the cooperative action of the needle 2, the awl 4, and a channel guide indicated at 50. The needle enters the work from the same side of the work with the work engaging end of the channel guide and the awl enters the work from the other side at a point displaced a stitch length from the needle. The channel guide remains continuously in engagement with the bottom of the channel, having no movement except a movement back and forth in the line of feed, the tension of the thread in the needle barb drawing the work against the channel guide each time the needle is retracted. The needle and awl move towards and from each other into and out of engagement with the work, and also have a movement relatively to each other back and forth in the line of feed, one or the other of these instruments, during the sewing of a seam, being in engagement with the work. During the movements of the needle and awl back and forth in the line of feed, the channel guide moves with the needle, always maintaining the same fixed position with relation to the needle in the line of feed so that no variation in tension can occur in the thread when the needle is retracted due to relative feeding movement between the channel guide and needle. The means for supporting the needle and awl in the machine comprise two carriages in the form of somewhat rectangular blocks, the carriage for the needle being indicated at 52, and the carriage for the awl being indicated at 54 (see particularly Figs. 5, 6, 7 and 8). The carriages 52 and 54 are mounted to slide back and forth in the line of feed on a guide rod 56 which passes through perforations in the upper ends of the carriages. Near their lower ends, the carriages are guided in slots formed in the frame of the machine, the slots being provided with vertical guiding surfaces extending parallel with the axis about which the needle and awl turn in piercing the work and engaging corresponding surfaces on the carriages. The needle and awl are clamped respectively on needle and awl segments 58 and 60 and these segments are mounted in the lower ends of the carriages 52 and 54 so as to move about the same axis. The needle segment 58 is mounted in the carriage 52 on a bearing block 62 which extends from the lower end of the carriage towards the awl carriage. The channel guide 50 is secured to the bearing block 62 by means of a clamping bolt 64 in position to engage the channel of a shoe sole close to the side of the needle towards which the shoe is fed. To insure the proper location of the channel guide without any particular care on the part of the operator, the bearing block 62 is provided with a projecting stud 66 which is square in cross-section and which is received in a correspondingly shaped hole in the carriage 52. The bearing block 62 is held rigidly secured to the carriage 52 by means of a clamping bolt 68 threaded into the carriage and engaging the stud 66. A needle guide, indicated at 70, is also mounted on the bearing block 62 between a shoulder formed on the block and the hub of the needle segment. This needle guide is actuated from the needle segment through connections similar to those disclosed in applicant's prior patents comprising a locking ball indicated at 72 mounted in the needle guide and arranged to engage cooperating recesses in the needle segment and in the surface of the shoulder on the bearing block. To mount the awl segment in the awl carriage 54 it is provided on opposite sides with bearing studs, one of which is received in a perforation in the bearing block 62 for the needle and the other of which is mounted to turn in a bearing in the lower end of the carriage 54. The awl segment is held from movement with relation to the carriage 54 in the line of feed by a shoulder on the segment engaging one end of the bearing and a washer 74 engaging the other end of the bearing, which washer is secured to the end of the bearing stud by means of a clamping screw 76.

Reciprocating movements back and forth in the line of feed are imparted to the needle and awl carriages 52 and 54 by means of levers 78 and 80, a separate lever being provided for each carriage and each lever being actuated from a cam groove in the cam disk 82, on the cam shaft 12 of the machine. Each lever at its forward end is rounded off and engages a vertical slot in its corresponding carriage, a close fit being secured by means of an adjusting screw 84 arranged to engage one side of the rounded end of the lever and press the other side against the opposite side of the slot.

Figures 8, 9, 13, 14, 15, 16:
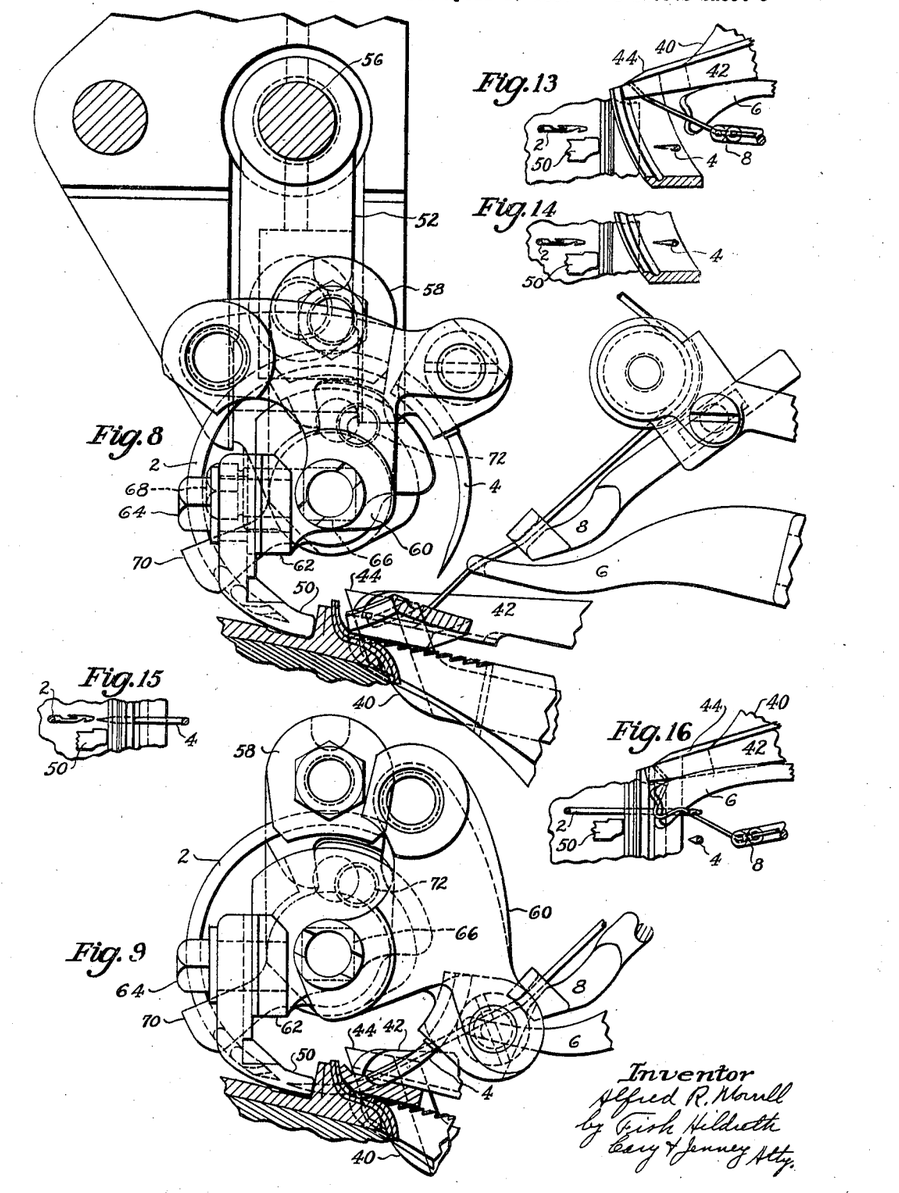
Figure 8 is a detail view in side elevation of the stitch-forming, work feeding and welt and thread handling devices adjacent the sewing point, illustrating the position of the parts at the start of the sewing operation.
Figures 9, 10 and 11 are views similar to Figure 8, with the machine frame and needle and awl carriages omitted, illustrating the position assumed by the stitch forming, work feeding and welt and thread handling devices at different points in the cycle of operations.
Figures 13 to 20 inclusive are somewhat diagrammatic views, illustrating the positions assumed by the stitch forming, work feeding, and welt and thread handling devices during the first two cycles of stitch forming operations.
Figures 10, 12, 17:
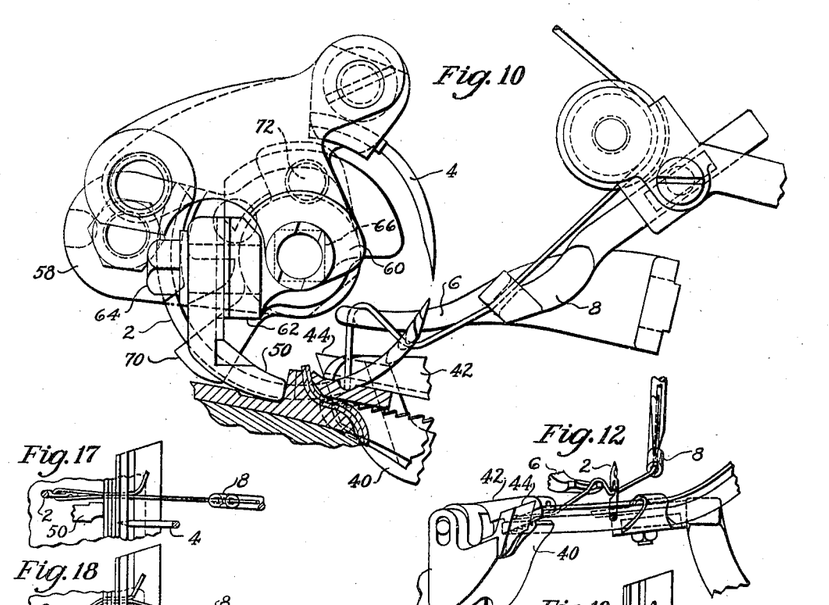
Figure 12 is a detail view in front elevation of certain of the parts illustrated in Figure 10.
Figures 11, 18, 19, 20:
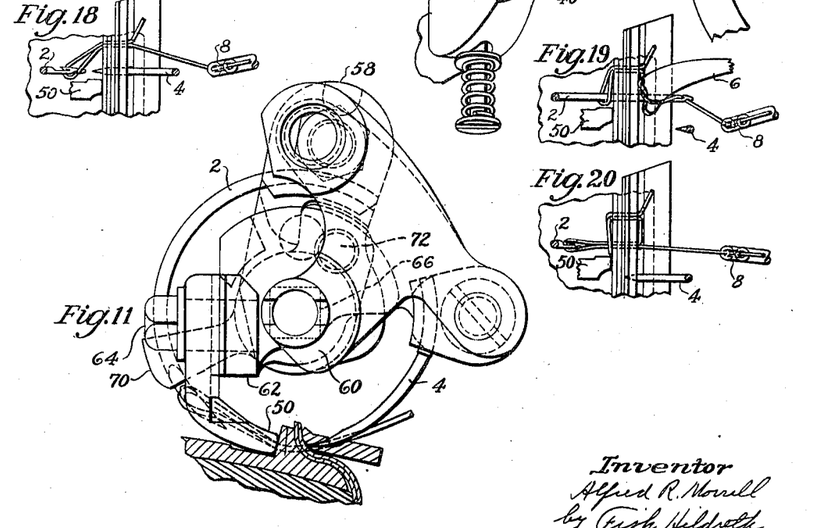

The manner in which the needle, awl and channel guide act to impart a continuous feeding movement to the work will be apparent from an inspection of Figures 5 to 20, inclusive, which shows the relative position of these parts at different points in a stitch forming cycle while the machine is sewing a seam. In Figure 18, the needle has been retracted from the work and the awl has pierced the work, the parts being in the same position as indicated in Figure 15 which illustrates the operation during the first cycle on starting the machine. After starting the machine, the thread is laid in the barb of the needle, as in Fig. 16, and when the threaded needle is retracted, the positions of Fig. 17 are reached. With the parts in the position illustrated in Figure 18, the awl is feeding the work and the needle and channel guide are being backfed. In Figure 19 the needle has advanced through the work and the awl has been retracted and backfed while the needle is in the work. With the parts in this position the work is being fed by the needle and channel guide, and the awl is about to enter the work. At this time the looper 8 and thread finger 6 at the same side of the work with the awl act again to lay the thread in the needle barb, as in Fig. 16. Upon retraction of the threaded needle, a tension is imparted to the thread to draw the sewing rib of the shoe firmly against the channel guide. In Figure 20 the awl has entered the work and is feeding the work while the needle has been withdrawn and, together with the channel guide, is being backfed.

Figure 3:
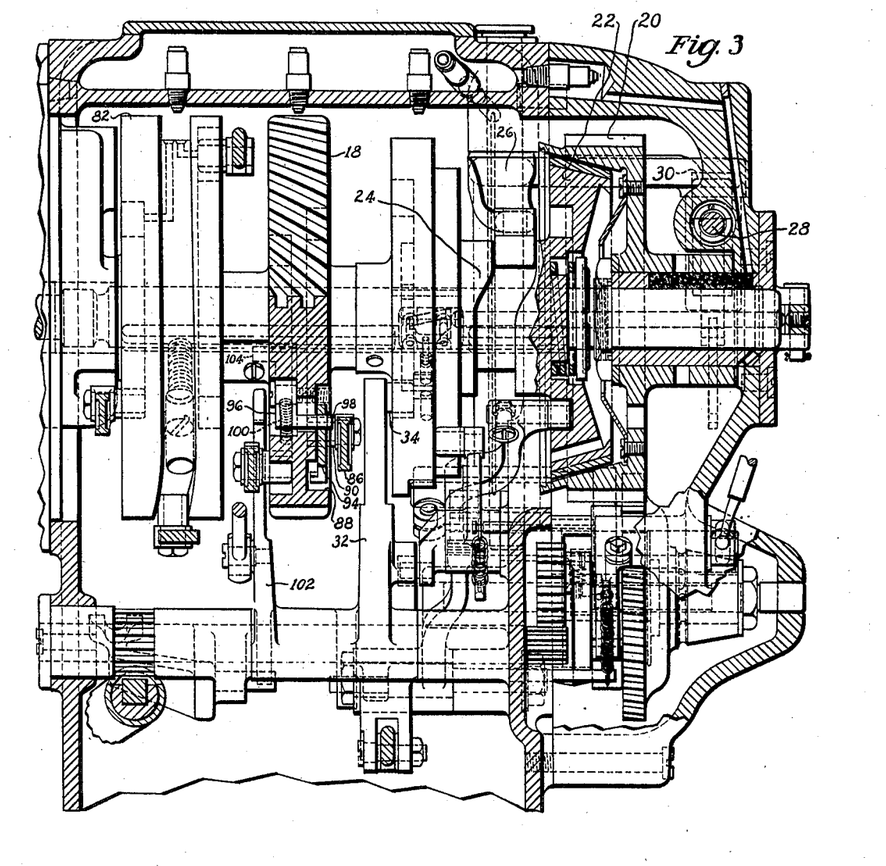
Figure 3 is a view in sectional elevation of a portion of the machine illustrating particularly the mechanism associated with the cam shaft.
Figure 4:
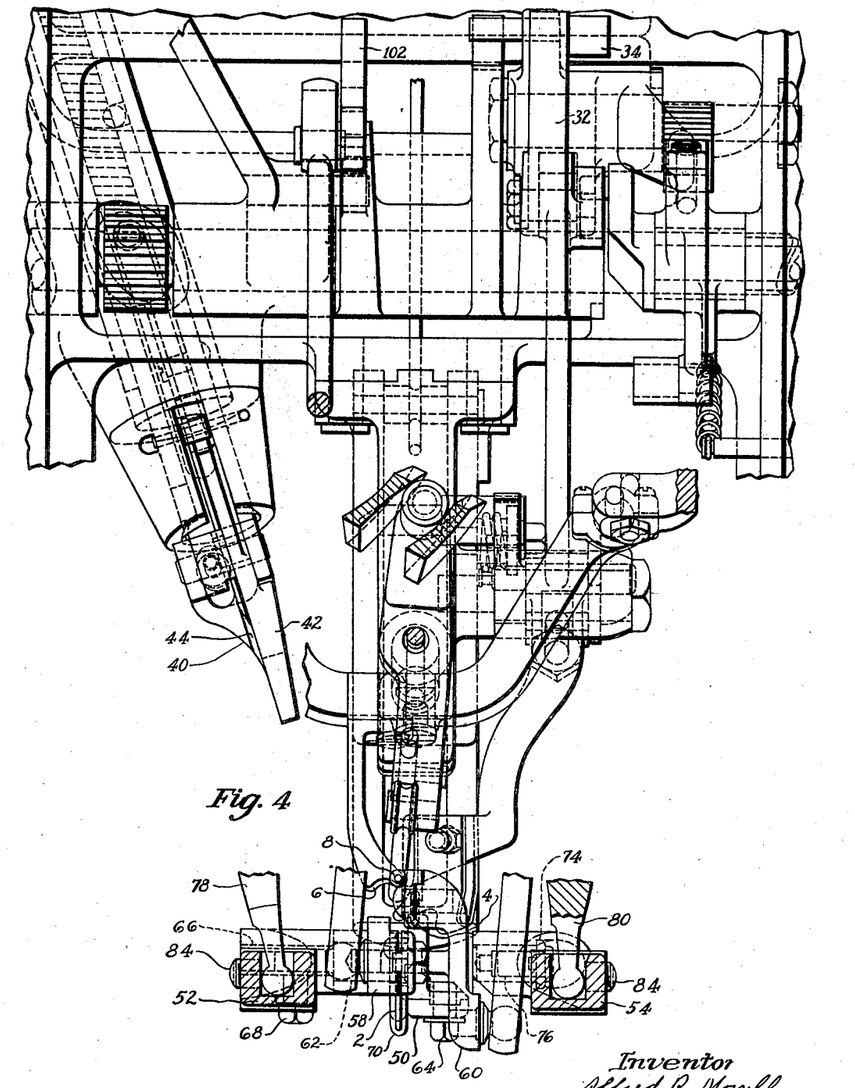
Figure 4 is a detail sectional plan view with portions of the frame broken away.
Figure 5:
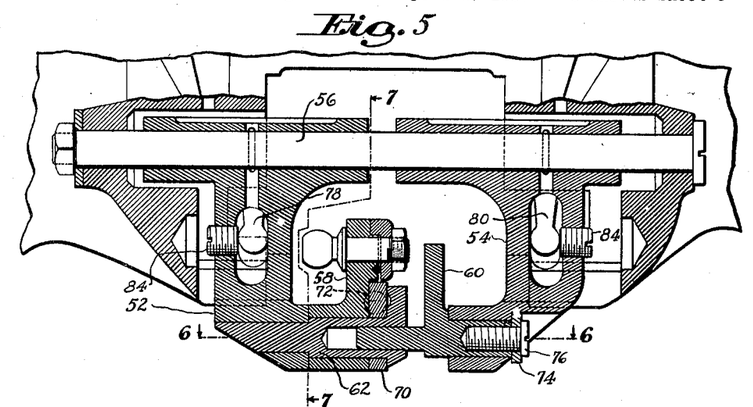
Figure 5 is a detail vertical sectional view, taken on the line 5—5 of Figure 1, illustrating particularly the carriages for the needle and awl.
Figure 6:
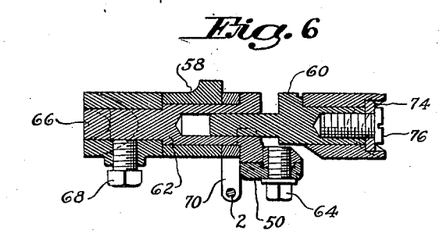
Figure 6 is a detail sectional plan view, taken on the line 6—6 of Figure 5.
Figure 7:
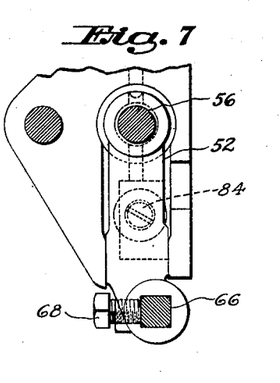
Figure 7 is a detail cross sectional view, taken on the line 7—7 of Figure 5.
Figures 22, 23:
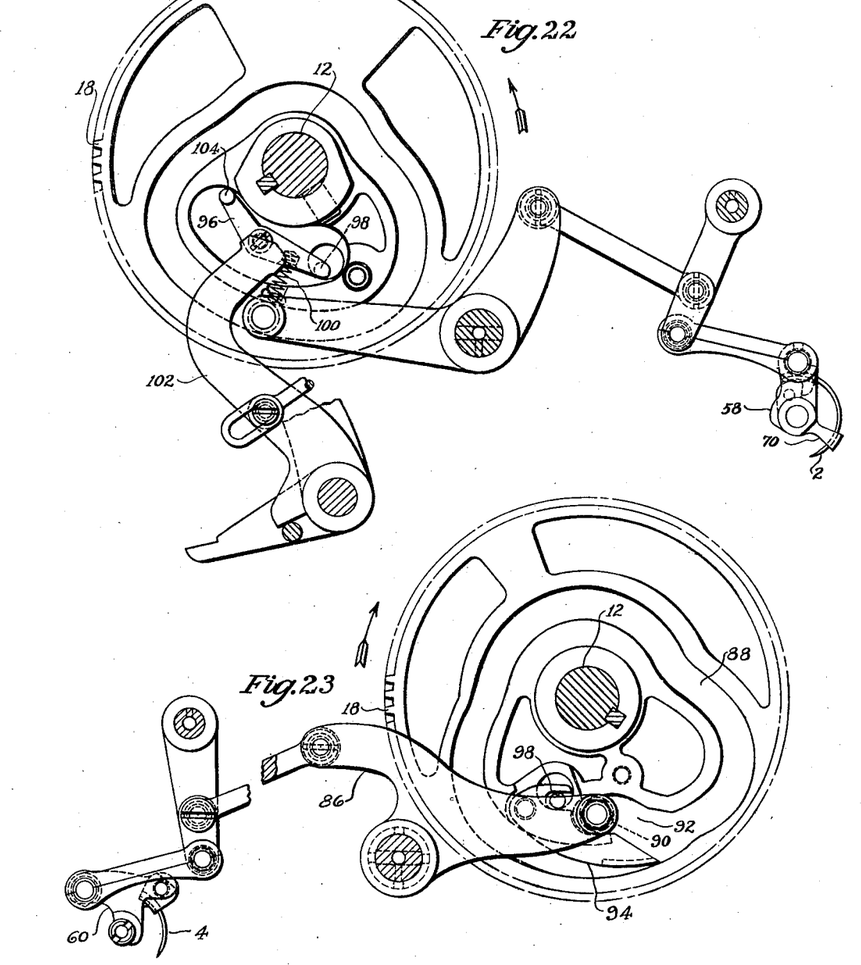
Figures 22 and 23 are detail sectional views, looking in opposite directions, of the mechanism for separating the needle from the awl upon stopping the machine.

To permit the shoe to be readily removed from the machine at the completion of the sewing operation, and also to permit a new shoe to be placed in position, means are provided which, upon stopping the machine with the needle retracted from the work, act to impart additional retracting movement to the awl so as to separate the awl from the needle. This brings the needle and awl into the positions indicated in Figure 13, in which position they remain until the machine has again started. The mechanism for imparting an additional retracting movement to the awl, upon stopping the machine, is best shown in Figures 3, 22 and 23. The awl actuating cam lever is indicated at 86 and the cam groove for actuating the lever is indicated at 88, this cam groove being formed in one face of the spiral gear 18 through which the cam shaft is driven. The lever 86 is provided with a follower 90 which, during the rotation of the cam shaft in a forward direction, as indicated by the arrow in Figure 23, remains in engagement with the cam groove 88. The cam groove 88 is shaped to give the desired work piercing and retracting movements to the awl during the sewing of the seam. Upon stopping the machine, a reverse movement is imparted to the cam shaft 12 by the driving and stopping mechanism and, in the construction shown, this reverse movement is utilized to impart an additional retracting movement to the awl, this retracting movement taking place while the needle is out of engagement with the work. To impart this additional retracting movement to the awl, the gear 18 is provided with an additional cam slot 92 leading from the cam groove 88 inwardly towards the cam shaft. Upon reverse rotation of the cam shaft, the follower 90 enters the cam slot 92 and, as the machine comes to rest, the lever 86 is actuated to retract the awl. The entrance of the follower 90 into the slot 92 during the reverse rotation of the cam shaft is insured by the provision of a switch cam 94 pivotally mounted on the gear 18 and normally held in a position to close the slot 92 and form a portion of one wall of the cam groove 88. During the reverse rotation of the cam shaft the switch cam is moved to the position indicated in Figure 23, in which position it extends across the cam groove 88 and opens the slot 92 for the entrance of the follower 90. For so actuating the switch cam 94, a lever 96 is mounted on the opposite face of the gear 18 from the switch cam and is provided with a pin 98 extending through an opening in the gear into engagement with a slot in the switch cam. During the forward rotation of the cam shaft in sewing a seam, the switch cam is held in a position closing the slot 92 by means of a spring 100 acting on the lever 96. Upon reverse rotation of the cam shaft, the lever 96 is actuated to move the switch cam from its closed position by means of a cam surface on the upper end of an arm 102 which projects from the hub of the stop arm 34. This cam surface is normally out of the path of a pin 104 on the opposite end of the lever 96 from the pin 98, but upon actuation of the stop arm 34 in stopping the machine, the cam surface is moved into the path of the pin 104 and causes an actuation of the lever 96 to move the switch cam 94 to its open position before the cam shaft comes to rest.

The nature and scope of the invention having been indicated, and a machine embodying the several features of the invention having been specifically described, what is claimed is:

1. A chainstitch inseam shoe sewing machine of that type in which the chain of the seam is laid in the channel of the insole having, in combination, stitch forming devices including a channel guide fixed transversely of the direction of feed, a curved hook needle arranged to enter the work from the same side of the work with the work engaging end of the channel guide and to draw the work against the channel guide by the tension on the thread when the threaded needle is retracted, an awl arranged to enter the work from the other side of the work from the work engaging end of the channel guide, a needle looper and a thread finger cooperating with the looper at the same side of the work with the awl, and mechanism for actuating the awl to engage the work when the needle is disengaged and all of said parts to impart a continuous feeding movement to the work comprising a carrier movable back and forth in the direction of feed upon which the awl is mounted, and a separate carrier movable back and forth in the direction of feed upon which the channel guide and needle are mounted.

2. A chainstitch inseam shoe sewing machine of that type in which the chain of the seam is laid in the channel of the insole having, in combination, stitch forming devices including a channel guide fixed transversely of the direction of feed, a curved hook needle arranged to enter the work from the same side of the work with the work engaging end of the channel guide and to draw the work against the channel guide by the tension on the thread when the threaded needle is retracted, an awl arranged to enter the work from the other side of the work from the work engaging end of the channel guide, a needle looper and a thread finger cooperating with the looper at the same side of the work with the awl, and mechanism for actuating the awl to engage the work when the needle is disengaged and all of said parts to impart a continuous feeding movement to the work comprising a carrier movable back and forth in the direction of feed upon which the awl is mounted, and a separate carrier movable back and forth in the direction of feed upon which the needle is mounted.

3. A chainstitch inseam shoe sewing machine of that type in which the chain of the seam is laid in the channel of the insole having, in combination, stitch forming devices including a channel guide fixed transversely of the direction of feed, a curved hook needle arranged to enter the work from the same side of the work with the work engaging end of the channel guide and to draw the work against the channel guide by the tension on the thread when the threaded needle is retracted, an awl arranged to enter the work from the other side of the work from the work engaging end of the channel guide, a needle looper and a thread finger cooperating with the looper at the same side of the work with the awl, and mechanism for actuating the awl to engage the work when the needle is disengaged and all of said parts to impart a continuous feeding movement to the work, timed to backfeed the channel guide and the needle while the awl is in the work.

4. A chainstitch inseam shoe sewing machine of that type in which the chain of the seam is laid in the channel of the insole having, in combination, stitch forming devices including a channel guide fixed transversely of the direction of feed, a curved hook needle arranged to enter the work from the same side of the work with the work engaging end of the channel guide and to draw the work against the channel guide by the tension on the thread when the threaded needle is retracted, an awl arranged to enter the work from the other side of the work from the work engaging end of the channel guide, a needle looper and a thread finger cooperating with the looper at the same side of the work with the awl, and mechanism for actuating the awl to engage the work when the needle is disengaged and all of said parts to impart a continuous feeding movement to the work timed to backfeed the awl while the needle is in the work.

5. A chainstitch inseam shoe sewing machine having, in combination, stitch forming and work feeding devices including two carriages, a guide rod on which said carriages are mounted to slide back and forth in the line of feed, a curved hook needle mounted on one of said carriages to move about an axis extending in the line of feed, a curved awl mounted on the other carriage to move about an axis in alignment with the needle axis, and a guideway for the carriages provided with guiding surfaces extending parallel with the needle and awl axes.

6. A chainstitch inseam shoe sewing machine having, in combination, stitch forming devices including a curved hook needle arranged to enter the work from the channel side, a curved awl arranged to enter the work from the side opposite the channel, means comprising a cam shaft and suitable connections for imparting work piercing and retracting movements to the needle and awl during each stitch forming cycle, means operating in stopping the machine to impart a reverse movement to the cam shaft, and means acting during such reversal to impart an additional retracting movement to the awl.

7. A chainstitch inseam shoe sewing machine having, in combination, stitch forming devices including a curved hook needle arranged to enter the work from the channel side, a curved awl arranged to enter the work from the side opposite the channel, means comprising a cam shaft and suitable connections for imparting work piercing and retracting movements to the needle and awl during each stitch forming cycle, said connections including an awl actuating cam provided with two cam paths and a follower to engage the cam paths, a switch to direct the follower from one path to the other, and means operating on stopping the machine, to actuate the switch.

8. A chainstitch inseam shoe sewing machine having, in combination, stitch forming devices including a curved hook needle arranged to enter the work from the channel side, a curved awl arranged to enter the work from the side opposite the channel, and means comprising a cam shaft and suitable connections for imparting work piercing and retracting movements to the needle and awl during each stitch forming cycle, said connections including an awl actuating cam follower and a cam provided with a cam path engaged by the follower during forward rotation of the cam shaft and with a cam path to be engaged by the follower upon reverse rotation of the cam shaft to impart an additional retracting movement to the awl.

9. A chainstitch inseam shoe sewing machine having, in combination, stitch forming devices including a curved hook needle arranged to enter the work from the channel side, a curved awl arranged to enter the work from the side opposite the channel, means comprising a cam shaft and suitable connections for imparting work piercing and retracting movements to the needle and awl during each stitch forming cycle; and means operating, on stopping the machine, to impart an additional retracting movement to the awl.

10. A chainstitch inseam shoe sewing machine having, in combination, stitch forming devices including a curved hook needle arranged to enter the work from the channel side, a curved awl arranged to enter the work from the side opposite the channel, and means comprising a cam shaft and suitable connections for imparting work piercing and retracting movements to the needle and awl during each stitch forming cycle, said connections including an awl actuating cam follower and a cam provided with a cam path engaged by the follower during forward rotation of the cam shaft and with a cam path to be engaged by the follower upon reverse rotation of the cam shaft to impart an additional retracting movement to the awl, a switch to direct the follower from one path to the other, means operating on stopping the machine to impart a reverse movement to the cam shaft, means for limiting the reverse movement of the cam shaft comprising a cam on the cam shaft provided with a slot and a follower to engage the slot on reverse rotation of the cam shaft, and connections between said last mentioned follower and the switch for actuating the switch.

ALFRED R. MORRILL.